US009554363B2

(12) United States Patent
Omeni (10) Patent No.: US 9,554,363 B2
(45) Date of Patent: Jan. 24, 2017

(54) TDMA-BASED COMMUNICATION METHOD AND SYSTEM WITH ENHANCED CLOCK DRIFT RESILIENCE

(75) Inventor: Okundu Omeni, Oxfordshire (GB)

(73) Assignee: TOUMAZ UK LIMITED, Oxfordshire (GB)

(*) Notice: Subject to any disclaimer, the term of this patent is extended or adjusted under 35 U.S.C. 154(b) by 142 days.

(21) Appl. No.: 13/995,747

(22) PCT Filed: Nov. 2, 2011

(86) PCT No.: PCT/EP2011/069265
§ 371 (c)(1),
(2), (4) Date: Aug. 28, 2013

(87) PCT Pub. No.: WO2012/084317
PCT Pub. Date: Jun. 28, 2012

(65) Prior Publication Data
US 2013/0336303 A1     Dec. 19, 2013

(30) Foreign Application Priority Data

Dec. 22, 2010 (GB) .................................. 1021670.3

(51) Int. Cl.
*H04W 56/00*      (2009.01)
*H04W 72/04*      (2009.01)
(Continued)

(52) U.S. Cl.
CPC .......... *H04W 72/04* (2013.01); *H04W 52/029* (2013.01); *H04W 56/003* (2013.01);
(Continued)

(58) Field of Classification Search
CPC .... H04W 72/04; H04W 52/02; H04W 52/029; H04W 56/003; H04B 7/2643; Y02B 60/50
See application file for complete search history.

(56) References Cited

U.S. PATENT DOCUMENTS 6,735,454 B1 * 5/2004 Yu ..................... H04W 52/0293
455/343.1
7,006,534 B1 * 2/2006 Nemoto ....................... 370/508
(Continued)

FOREIGN PATENT DOCUMENTS

EP    0 936 758 A2    8/1999
EP    1 933 507 A1    6/2008
(Continued)

OTHER PUBLICATIONS

International Search Report, dated Dec. 15, 2011, and Written Opinion, issued in priority International Application No. PCT/EP2011/069265.
(Continued)

*Primary Examiner* — Joshua Kading
(74) *Attorney, Agent, or Firm* — Saul Ewing LLP (57) ABSTRACT

A TDMA-based communication method for enabling communication between a base station and a client, the base station and the client each comprising a clock for synchronizing communications, the method comprising: allocating a TDMA channel to said client; causing a transceiver of the client to operate in a communication mode during client timeslots making up said allocated channel and to operate in a sleep mode at other times; causing a transceiver of said base station to begin operating in a communication mode with said client on said channel in advance of each said client timeslot and/or to continue operating in a communication mode with said client after each said client timeslot.

21 Claims, 3 Drawing Sheets

(51) Int. Cl.
   *H04B 7/26*     (2006.01)
   *H04W 52/02*    (2009.01)

(52) U.S. Cl.
   CPC .......... *H04B 7/2643* (2013.01); *H04W 52/02* (2013.01); *Y02B 60/50* (2013.01)

(56)                  References Cited

U.S. PATENT DOCUMENTS

| | | | |
|---|---|---|---|
| 7,020,501 B1 * | 3/2006 | Elliott | H04W 52/0216 370/338 |
| 2002/0105970 A1 | 8/2002 | Shvodian | |
| 2004/0253996 A1 | 12/2004 | Chen et al. | |
| 2008/0056166 A1 | 3/2008 | Suzuki et al. | |
| 2009/0175258 A1 | 7/2009 | Wang et al. | |
| 2010/0232415 A1 * | 9/2010 | Hayashino et al. | 370/348 |
| 2012/0127902 A1 * | 5/2012 | Muqattash | H04W 52/0229 370/311 |

FOREIGN PATENT DOCUMENTS

| | | |
|---|---|---|
| GB | 2464942 A | 5/2010 |
| WO | 2009/044368 A2 | 4/2009 |

OTHER PUBLICATIONS

Search Report, dated Apr. 13, 2011, issued in priority Great Britain Application No. GB1021670.3.

* cited by examiner

TDMA-BASED COMMUNICATION METHOD AND SYSTEM WITH ENHANCED CLOCK DRIFT RESILIENCE

CROSS REFERENCE TO RELATED APPLICATIONS

This application claims the priority of PCT/EP2011/069265, filed on Nov. 2, 2011, which claims priority to Great Britain Application No. 1021670.3, filed Dec. 22, 2010, the entire contents of which is hereby incorporated in total by reference.

FIELD OF THE INVENTION

This invention relates to a TDMA (Time Division Multiple Access) based communication method and a system for carrying out the same. Other aspects of the invention relate to a base station and a client for said TDMA system.

BACKGROUND TO THE INVENTION

In low power (e.g. wireless) communication systems using TDMA, timing is a critical parameter which significantly affects how timeslots can be effectively allocated and utilized.

Usually a timeslot is assigned by a central node or base station, and a client (e.g. a sensor node) is required to ensure its communication with the base station is within its allocated timeslot. This requirement therefore imparts constraints on the precision of clocks that can be used by the client. However, in applications where it is desirable to employ low power and/or low cost clients (e.g. as disposable sensor nodes), it is also desirable to employ simpler and cheaper clocks, which are generally less precise.

To date this problem has been overcome by ensuring that the client wakes up in advance of its allocated slot (as determined by the clock on the client) while the base station is configured to begin transmitting at the allocated start time (according to its own, usually more precise clock) so that the client will always be awake when the base station transmission begins. The disadvantage with this approach is that, typically, the client will wake up early and may have to wait some time before the base station transmission begins. This wasted time consumes power and is therefore highly undesirable in such low cost devices.

Even when a client node has a clock of the same or similar precision as the base station, it may have to wake up occasionally to synchronise its clock with the base station if it has a very long sleep period. This is particularly important when there are other clients on the same network using other timeslots. This system therefore places the onus on the client to wake up at known time intervals in order to keep in sync with the base station and this constitutes an additional power expenditure.

It is therefore an aim of the present invention to provide a TDMA-based communication method and system that addresses the aforementioned problems.

SUMMARY OF THE INVENTION

According to a first aspect of the present invention there is provided a TDMA-based communication method for enabling communication between a base station and a client, the base station and the client each comprising a clock for synchronising communications, the method comprising: allocating a TDMA channel to said client; causing a transceiver of the client to operate in a communication mode during client timeslots making up said allocated channel and to operate in a sleep mode at other times; causing a transceiver of said base station to begin operating in a communication mode with said client on said channel in advance of each said client timeslot and/or to continue operating in a communication mode with said client after each said client timeslot.

The base station may therefore be allocated base timeslots making up said TDMA channel, wherein said base timeslots are arranged to begin in advance of said client timeslots and/or to expire after said client timeslots.

Thus, embodiments of the present invention provide a method in which the base station (e.g. hub) begins operating in communication mode with the client (e.g. node) at a slightly earlier time than allocated to the client so that when the client wakes up the base station will always be ready for communication with the client. The method therefore allows a poor precision clock to be used by a client without requiring the client to be in communication mode when it is not actually in communication with the base station. Accordingly, an optimal low duty cycle can be achieved by the client, thereby maximising the sleep time of the device and minimising power consumption.

It will be understood that when the base station is operating in communication mode with the client, the base station may either be transmitting to the client or listening for a signal from the client. Similarly, when the client is operating in communication mode with the base station, the client may either be transmitting to the base station or listening for a signal from the base station.

In embodiments of the invention, the base station may be configured as the initiator of communications and so the base station may begin transmitting to the client prior to the client timeslot. In other embodiments, the client may be configured as the initiator of communications and so the base station may begin listening for the client prior to the client timeslot. In either case, the initiator may repeat its transmission until it receives a response or until the initiator stops operating in its current communication mode.

In embodiments of the invention, the method may be employed for enabling wireless communication between the base station and the client.

The method may comprise the step of the client returning to sleep mode at the end of the client timeslot even if it has not completed its communication with the base station. For the case when the client is out of range of the base station or a communication channel is otherwise unavailable, the method may comprise the step of the client returning to sleep mode at the end of the client timeslot even if it has not begun its communication with the base station. In other words, the client may listen for a transmission from the base station for the whole of the client timeslot and if no transmission is received by the client it may return to sleep mode.

The method may further comprise the step of causing the base station to transmit a synchronising signal to the client. The synchronising signal may cause the client to adjust (e.g. reset) its clock in line with the base station clock. The synchronising signal may be transmitted a plurality of times when the base station is in communication mode with the client. In particular embodiments, the synchronising signal may be transmitted in response to receipt of a signal from the client.

The base station may begin operating in a communication mode with the client at a time calculated to take into account an expected drift of at least the clock for the client. The time may be calculated by applying the expected drift to the times when the transceiver of the client operates in sleep mode.

In embodiments of the invention, the base station clock may be more precise than the client clock. In which case, it will be understood that the base station may use its more accurate timing information to trade-off available bandwidth for low power operation on a low power client.

In other embodiments, the base station clock may have a precision which is less than or equal to the precision of the client clock. In which case, the base station may begin operating in a communication mode with the client at a time calculated to take into account a worst case clock offset between the base station and the client. This may be achieved by taking into account an expected drift of the clock for the client plus an expected drift of the clock for the base station. The time may be calculated by applying the worst case clock offset to the times when the transceiver of the client operates in sleep mode.

The base station may continue to operate in communication mode with the client after each allocated client timeslot until a time calculated to take into account an expected drift of at least the clock for the client (this may therefore take into account a worst case clock offset between the base station and the client). The base station may stop operating in communication mode with the client after the client has finished its communication with the base station during the client timeslot.

According to a second aspect of the present invention there is provided a TDMA communications system comprising: a base station and a client each comprising a clock for synchronising TDMA communications therebetween, the client comprising a transceiver configured to operate in a communication mode during client timeslots making up an allocated TDMA channel and to operate in a sleep mode at other times; the base station comprising a transceiver configured to operate in a communication mode with said client in advance of each said client timeslot and/or to continue operating in a communication mode with said client after each said client timeslot.

According to a third aspect of the present invention there is provided a base station for a TDMA communications system comprising: a clock for synchronising TDMA communication with a client; and a transceiver configured to operate in a communication mode with said client during base timeslots making up a TDMA channel and wherein said base timeslots are arranged to begin in advance of allocated client timeslots making up said TDMA channel and/or to expire after said client timeslots.

According to a fourth aspect of the present invention there is provided a client for a TDMA communications system comprising: a clock for synchronising TDMA communication with a base station; and a transceiver configured to operate in a communication mode during client timeslots making up a TDMA channel and to operate in a sleep mode at other times; wherein said client timeslots are arranged to begin after allocated base timeslots making up said TDMA channel at said base station and/or to expire before said base timeslots.

An object of the present invention is to ensure that the client wakes up after the base station so that the base station is always ready when the client is ready to communicate. This can be achieved either by making the base station wake up in advance of the allocated client timeslot or by making the client wake up after the beginning of the allocated base timeslot.

In one embodiment, the client timeslot may have a duration of X and the base timeslot may have a duration of 2X. This may be achieved may allocating 2 standard duration slots for use by the base station and allocating 1 standard duration slot for use by the client. In other embodiments, the base station may be allocated 1 standard duration slot and the client may be allocated a shorter duration slot (i.e. ½ a standard duration slot).

DETAILED DESCRIPTION OF CERTAIN EMBODIMENTS

Figure 1:
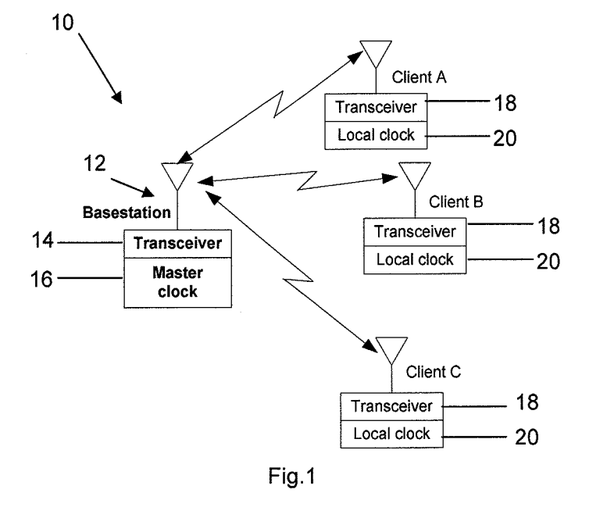
FIG. 1 illustrates a (wireless) TDMA communications system according to an embodiment of the present invention.

In an embodiment of the invention, there is provided a TDMA communications system 10, as illustrated in FIG. 1, in which a base station 12 is configured for wireless TDMA communication with three clients A, B, C. Other embodiments of the invention may be applied to other types of TDMA communication systems such as those operated over fixed lines, for example, in local area networks.

The base station 12 comprises a wireless transceiver 14 and a master clock 16. Similarly, each client A, B, C is provided with a wireless transceiver 18 and a local clock 20. In this embodiment, the master clock 16 is more accurate than each local clock 20 (which is provided in the form of an on-chip timer).

Figure 2:
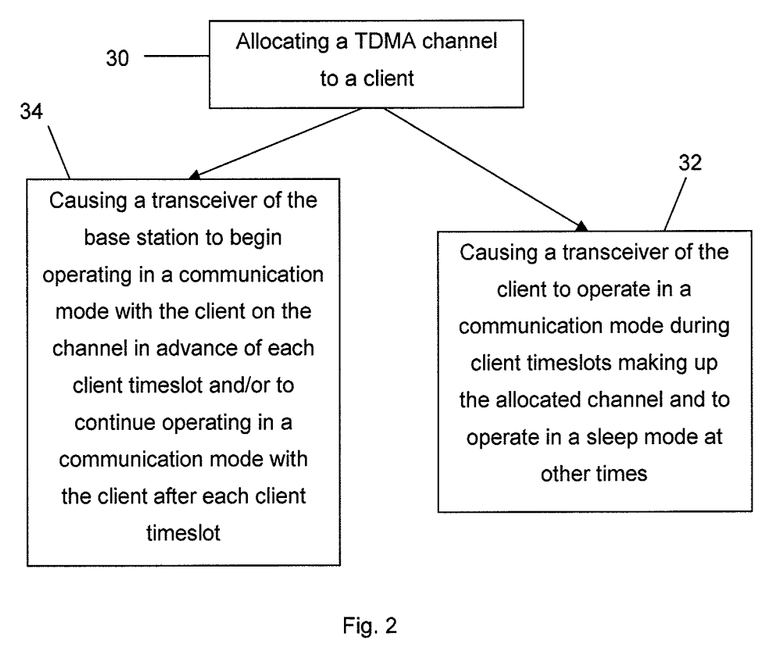
FIG. 2 illustrates a TDMA-based communication method for enabling communication between a base station and a client, in accordance with an embodiment of the present invention.

FIG. 2 illustrates a TDMA-based communication method for enabling communication between said base station 12 and said clients A, B, C in accordance with an embodiment of the present invention. The method comprises a step 30 of allocating a TDMA channel to one of said clients A, B, C. The method also comprises a step 32 of causing a transceiver of the client to operate in a communication mode during client timeslots making up the allocated channel and to operate in a sleep mode at other times. In addition, the method comprises a step 34 of causing a transceiver of the base station to begin operating in a communication mode with the client on the channel in advance of each client timeslot and/or to continue operating in a communication mode with the client after each client timeslot.

Thus, in accordance with an embodiment of the present invention, the client A/B/C is allocated client timeslots NS making up the TDMA channel from the client perspective and the base station 12 is allocated base timeslots $NS_{BS}$ making up the TDMA channel from the base station perspective, and wherein the base timeslots $NS_{BS}$ are arranged to begin in advance of the client timeslots NS and/or to expire after the client timeslots NS. In other words, the client timeslots NS are arranged to begin after the base timeslots $NS_{BS}$ and/or to expire before said base timeslots $NS_{BS}$.

Although not illustrated, it will be understood that the method described above will also be applied to each other client A/B/C so that each client A, B, C is allocated a separate TDMA channel by the base station 12. In addition, each client transceiver 18 is configured to operate in a communication mode during its respective client timeslots making up its allocated channel and to operate in a sleep mode at all other times.

The base station transceiver 14 is configured to begin transmitting to each of the clients A, B, C on its allocated TDMA channel in advance of the associated client timeslot as will now be described in detail, in relation to FIG. 3.

In the case where a client A/B/C is allocated, by a base station 12, a client timeslot (i.e. node slot) NS and a wakeup interval (or sleep time) WI between successive timeslots, the client A/B/C will have a duty cycle of NS/WI.

The base station 12, which assigned the client timeslot NS, is, however, configured to operate in communication mode with the client A/B/C for a longer duration than the client timeslot so as to ensure that the client A/B/C will be able to communicate with the base station 12 when the client A/B/C awakes, even when the client's clock 20 is inaccurate. The base station 12 therefore operates using a compensated base timeslot which includes guard times added to the start and end of the client timeslot in order to compensate for drift caused by the poor precision clock 20 of the client A/B/C. In addition, the base station 12 employs a wakeup interval $WI_{BS}$ between successive compensated base timeslots, which represent the worst case drift of the client clock 20 during WI. It is noted that employing these two adjusted times at the base station 12 allows the client A/B/C to achieve its intended duty cycle without any adjustments being required at the client A/B/C in order to account for its inaccurate clock 20.

If we consider the situation where the client (e.g. sensor node) A/B/C has a relative clock 20 precision of $D_{SN}$ (i.e. actual time=client clock time+/−$D_{SN}$%) and the base station (e.g. central node) 12 has a relative clock 16 precision of $D_{CN}$, then the rest of the network parameters can be calculated as follows.

The worst case clock offset $D_{WC}$ between the base station 12 and the client A/B/C can be calculated from equation (1) below.

$$D_{WC}=(D_{SN}+D_{CN}) \quad (1)$$

The base station 12 wakeup interval $WI_{BS}$ can be obtained from equation (2) below.

$$WI_{BS}=WT*(100-D_{WC}) \quad (2)$$

The guard times GT0 and GT1 added, respectively, to the start and end of the allocated client timeslot at the base station 12 can be obtained from equation (3) below.

$$GT0=GT1=WI*D_{WC} \quad (3)$$

The compensated base timeslot $NS_{BS}$ employed by the base station 12 can then be obtained from equation (4).

$$NS_{BS}>=GT0+NS+NS*D_{WC}+GT1 \quad (4)$$

Figure 3:
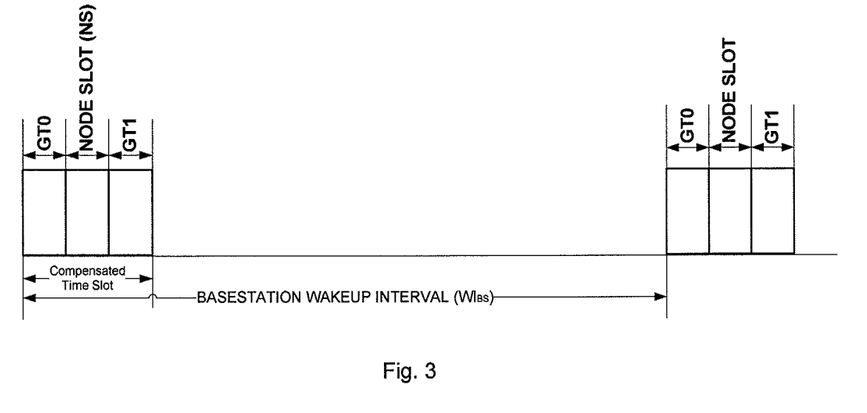
FIG. 3 illustrates an allocated client timeslot (node slot) together with the timing operation of the base station, in accordance with an embodiment of the present invention.

It should be noted that although the illustration shown in FIG. 3 represents the timing in relation to communication between the base station 12 and a single client A/B/C, the base station 12 can be similarly configured to operate in further compensated base timeslots with other clients A/B/C as mentioned above. The maximum number of clients A/B/C (i.e. slots) that the base station 12 can communicate with in one cycle can be obtained from equation (5).

$$N_{SLOTS}=\lceil WI/NS_{BS}\rceil \quad (5)$$

Example 1

$$D_{SN}\gg D_{CN}$$

For comparison, we will calculate the respective duty cycles for a client A and a base station 12 communicating with just that client A, in accordance with the above method, assuming that base station 12 is active for the whole of the compensated base timeslot ($NS_{BS}$), while the client A is only active for the client timeslot (NS).

In this example, we will assume that the client A has a timer precision of $D_{SN}$=1% and the base station 12 has a timer precision of $D_{CN}$=0.001% (i.e. $D_{SN}\gg D_{CN}$ as is likely to be the case where the client employs a cheap inaccurate clock and the base station employs a more expensive, more precise clock). In this case, we can therefore assume that $D_{WC}\approx D_{SN}$.

In addition, we will assume that the client A is configured to sleep for WI=2 minutes and to communicate for a maximum of NS=100 ms when it wakes up. We can therefore calculate the base station 12 wakeup interval $WI_{BS}$, the guard times GT0 and GT1, and the compensated base timeslot $NS_{BS}$ as follows:

$$WI_{BS}=120*(100-1)/100=118.8 \text{ seconds}$$

$$GT0=GT1=120*1/100=1.2 \text{ seconds}$$

$$NS_{BS}>=1.2+0.1+0.1*0.01+1.2=2.5 \text{ seconds}$$

Consequently, for this one client A, the duty cycle $DC_{CN}$ of the base station 12 is:

$$DC_{CN}<=NS_{BS}/WI_{BS}=2.5/118.8\approx 2.1\%$$

Similarly, the worst case duty cycle $DC_{SN}$ for the client A is:

$$DC_{SN}=NS/WI=0.1/118.8=0.08\%$$

For comparison, the applicants have calculated that the duty cycle calculated above for the client A is 25 times better (i.e. 25 times lower) than that which could be achieved with traditional methods (where the duty cycle is the same as the worst case precision which in this case is 2%), such as those involving waking the client up earlier than the base station. It is therefore hugely advantageous to ensure that the base station compensates for the inaccurate timing of the client, in accordance with embodiments of the present invention.

It can therefore be seen that embodiments of the present invention can be employed to minimise the duty cycle for the client A, while maintaining a desired communication link with the base station 12 even when an inaccurate clock 20 is employed by the client A.

Example 2

$$D_{SN}=D_{CN}$$

In a further embodiment of the present invention we can consider the case where the client A has a timer precision of $D_{SN}$=0.001% and the base station 12 also has a timer precision of $D_{CN}$=0.001% (i.e. $D_{SN}=D_{CN}$ as is the case where the same clocks are employed by the client and the base station).

In this case, the worst case clock offset $D_{WC}$=($D_{SN}$+$D_{CN}$)=0.002%.

In addition, we will assume that the client A is configured to sleep for WI=2 hours and to communicate for a maximum of NS=100 ms when it wakes up. We can therefore calculate the base station 12 wakeup interval $WI_{BS}$, the guard times GT0 and GT1, and the compensated base timeslot $NS_{BS}$ as follows:

$$WI_{BS}=2*3600*(100-0.002)/100=7199.856 \text{ seconds}$$

$$GT0=GT1=2*3600*0.002/100=0.144 \text{ seconds}$$

$NS_{BS} >= 0.144 + 0.1 + 0.1*(0.002/100) + 0.144 \approx 0.4$ seconds

Consequently, for this one client A, the duty cycle $DC_{CN}$ of the base station 12 is:

$DC_{CN} <= NS_{BS}/WI_{BS} = 0.4/7199.856 \approx 0.0056\%$

Similarly, the worst case duty cycle $DC_{SN}$ for the client A is:

$DC_{SN} = NS/WI = 0.1/7199.856 = 0.0014\%$

Thus, even when the accuracy of the base station clock is the same as the client clock, it is possible to reduce the duty time for the client by employing the method according to the present invention.

Centralized Guard Time Provisioning

Figure 4:
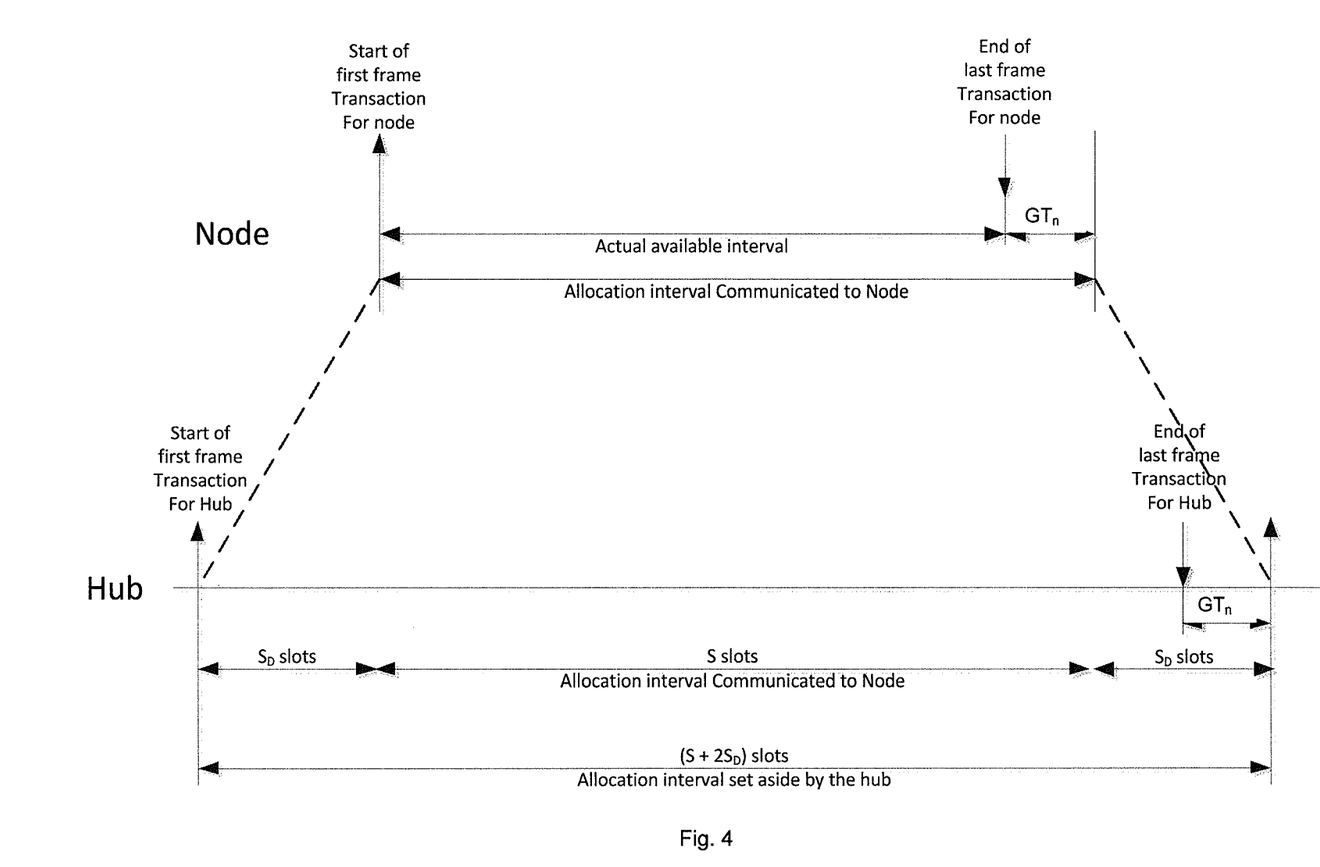
FIG. 4 illustrates a further embodiment of the invention employing so-called centralized guard time provisioning.

Embodiments of the present invention may be configured for so-called centralized guard time provisioning. In which case, the hub will insert an appropriate guard time at the beginning and end of its allocation interval for a node having centralized guard time provisioning as illustrated in FIG. 4.

For example, a node may indicate that it requires centralized guard time provisioning in a MAC Capability field. The hub will then send the node an allocation interval having a connection assignment of S slots per interval and the hub will set aside a total of $(S+2S_D)$ slots for its communication with the node in order to compensate for a clock drift of $S_D$ slots before and after the S slots respectively, as shown in FIG. 4. In this case, $S_D$ is derived from superframe slot time $T_{Slot}$ (which is the length of time for 1 slot in the superframe), the node's maximum synchronization interval $SI_N$, the hub clock's accuracy in PPM (parts per million) $P_H$, and the node clock's accuracy in PPM $P_N$, in accordance with equations (6) and (7) below, where the term 'ceiling' denotes rounding the figure up to the nearest whole number of slots. This rounding makes management of the allocation less complex for the hub. Alternately if the hub chooses, it could set aside a guard time of $T_{Drift}$ ($T_{Drift}=GT0=GT1$ in FIG. 3) as derived from equation (6) at the beginning and end of the allocated slot for the node. The hub may also set aside additional time (in addition to $T_{Drift}$) depending on the adjacent slot timing requirements. Another important point is the fact that it is the total amount of guard time set aside that matters rather than where it is put. Instead of providing guard time at the start and end (as illustrated in FIG. 4), the guard time could be entirely provided before or after the node's allocation, in which case the node would start its communication $T_{Drift}$ early or later respectively.

$T_{Drift} = SI_N \times (P_H + P_N)$ (6)

$S_D = \text{ceiling}((T_{Drift})/T_{Slot})$ (7)

In addition to the above, as shown in FIG. 4, the node may compute a guard time $GT_n$ which will infer the end of the actual available interval for communications with the node, within the allocation interval communicated to the node. In practice, $GT_n$ is provided at the end of the actual available interval at the node after the end of the last frame transaction for the node. The guard time $GT_n$ is calculated in accordance with equations (8), (9) and (10) where pSIFS is the receive-to-transmit or transmit-to-receive turnaround time, pExtraIFS is the synchronization error tolerance and mClockResolution is the timing uncertainty. The parameter $D_n$ represents the maximum clock drift of the node or the hub relative to an ideal (nominal) clock over $SI_n$, where $SI_n$ delimits a nominal synchronization interval over which the clock drifts of the node and the hub are accounted for in the nominal guard time $GT_n$.

$GT_0 = p\text{SIFS} + p\text{ExtraIFS} + m\text{ClockResolution}$ (8)

$D_n = SI_n \times P_H$, where $SI_n = m\text{NominalSynchInterval}$ (9)

$GT_n = GT_0 + 2 \times D_n$ (10)

The node may also calculate a guard time $GT_C$, to compensate for its clock drift when listening for an initialization beacon or a future poll or post in accordance with equation (11) below.

$GT_C = GT_0 + SI_N \times (P_H + P_N)$ (11)

Furthermore, the hub may calculate a guard time $GT_n$ provided after the end of the last frame transaction for the hub, within the allocation interval set aside by the hub for communication with the node (i.e. within the allocated $S+2S_D$ slots). The guard time may be calculated in accordance with equation (10) as for the node.

The node and the hub will therefore account for guard times in their frame transmission and reception as follows:

The hub will commence its beacon transmission at the nominal start of the beacon.

The hub will commence its transmission in the node's next scheduled downlink or bilink allocation interval before the start of the interval communicated to the node, and shall end its transmission after the end of the interval communicated to the node, early enough such that the last transmission from the hub completes no later than $GT_n$ before the end of the interval set aside by the hub.

The hub shall commence its transmission of the node's next future poll or post at the nominal start of the poll or post.

The hub shall commence its reception in the node's next scheduled uplink or bilink allocation interval before the start of the interval communicated to the node, and shall end its reception after the end of the interval communicated to the node, early enough such that the last frame completes no later than $GT_n$ before the end of the interval set aside by the hub.

The node shall commence its transmission or reception in its next scheduled uplink, downlink or bilink allocation interval at the nominal start of the allocation interval and shall end its transmission in an uplink allocation interval early enough such that the last transmission in the interval completes $GT_n$ prior to the nominal end of the interval at the node.

The node shall commence its reception of the beacon up to $GT_C - GT_0$ earlier than the nominal start of the beacon to account for pertinent clock drifts since it last synchronized with the hub.

The node shall commence its reception of its next poll or post up to $GT_C - GT_0$ earlier than the nominal start of the poll or post to account for pertinent clock drifts, where the node's last synchronization interval is measured up to the nominal start of the poll or post.

Furthermore, the node will synchronize with the hub at least once within its maximum synchronization interval $SI_N$ as indicated in its last transmitted Connection Request frame.

Some motivation for the present invention is as follows:

Supporting 20 or 40 ppm resolution requires nodes to include a second low power timing crystal oscillator which adversely affects the cost and size of the sensor node;

Additional guard time provides a mechanism for nodes to trade-off available bandwidth for lower duty cycle and hence they can use lower timing resolution not requiring a crystal oscillator;

Unfortunately, the node normally has to do this computation itself as well as set aside guard times at the start and end of its required allocation;

The present invention provides a simple mechanism that removes the burden of doing this from the node and allows timing compensation to be centralized at the hub;

More importantly, embodiments of the invention allow nodes with poor timing resolution to achieve significantly better duty cycles than their clock resolution theoretically allows;

This enables a hub to support nodes with latencies in minutes (e.g. temperature sensors) together with nodes with latencies of 10's of ms (e.g. ECG sensors) on the same network;

This also allows small low cost nodes without Carrier Sense Multiple Access (CSMA) support to co-exist with much higher throughput nodes;

Also hubs can sleep when they don't have traffic and so save power.

Example 3

A node has a clock resolution of 500 ppm, but wants a duty cycle equivalent to 100 ppm i.e. 5 times its capability. Let us imagine that it is trying to join a hub that has 40×2 ms slots, with 10 slots set aside for random access protocols (e.g. RAP2). Further, the node wants a wake-up interval of 20 seconds which is communicated as 250 multi-periodic (m=250). So how does the hub support this?

The maximum drift for the node during the wake-up interval is ~500 ppm in 20 secs=2×10 ms=20 ms=10 slots in total (or 5 slots before and after the node's allocation).

With the proposed mechanism, if the hub assigns the node slot 25, it needs to set aside slots 20 to 30 in the node's wake-up superframe. This makes it possible for 1 periodic nodes like ECG streaming nodes to co-exist with this much lower power, longer term sensor nodes.

It will be appreciated by persons skilled in the art that various modifications may be made to the above embodiments without departing from the scope of the present invention.

The invention claimed is:

1. A TDMA-based communication method for enabling communication between a base station and a client, the base station and the client each comprising a clock for synchronising communications, the method comprising:
allocating a TDMA channel to said client, the TDMA channel being defined by a sequence of frames, each frame comprising one or more client time slots and one or more respective base time slots, each base time slot beginning in advance of and/or continuing after the respective client time slot;
causing a transceiver of the client to operate in a communication mode during the one or more client time slot making up each frame of said allocated channel and to operate in a sleep mode at other times; and
causing a transceiver of said base station to begin operating in a communication mode with said client during the one or more base time slot(s) making up each frame of said allocated channel, such that when the base station transceiver begins operating in a communication mode said client is expected to be in a sleep mode or when the base station transceiver stops operating in a communication mode said client is expected to be in a sleep mode, wherein a determination that said client is expected to be in a sleep mode comprises taking into account an expected drift of the client clock and/or the base station clock.

2. The method according to claim 1 wherein when the base station is operating in communication mode with the client, the base station is either transmitting to the client or listening for a signal from the client.

3. The method according to claim 1 wherein when the client is operating in communication mode with the base station, the client is either transmitting to the base station or listening for a signal from the base station.

4. The method according to claim 1 wherein the base station is configured as the initiator of communications and begins transmitting to the client prior to the client time slot.

5. The method according to claim 1 wherein the client is configured as the initiator of communications and begins listening for the client prior to the client time slot.

6. The method according to claim 4 wherein the initiator repeats its transmission until the initiator receives a response or until the initiator stops operating in its current communication mode.

7. The method according to claim 1, wherein the client communicates with the base station when the transceiver of the client is operating in the communication mode, the method further comprising a step of the client returning to sleep mode at the end of the client timeslot even if the client has not completed communication with the base station.

8. The method according to claim 1, wherein the client communicates with the base station when the transceiver of the client is operating in the communication mode, the method further comprising a step of the client returning to sleep mode at the end of the client timeslot even if the client has not begun communication with the base station.

9. The method according to claim 8 wherein the client listens for a transmission from the base station for the whole of the client time slot and if no transmission is received by the client it returns to sleep mode.

10. The method according to claim 1 further comprising the step of causing the base station to transmit a synchronising signal to the client.

11. The method according to claim 10 wherein the synchronising signal causes the client to adjust its clock in line with the base station clock.

12. The method according to claim 10 wherein the synchronising signal is transmitted a plurality of times when the base station is in communication mode with the client.

13. The method according to claim 10 wherein the synchronising signal is transmitted in response to receipt of a signal from the client.

14. The method according to claim 1 wherein the base station begins operating in a communication mode with said client at a time calculated to take into account a worst case clock offset between the base station and the client.

15. The method according to claim 14 wherein the time is calculated by applying the worst case clock offset to said times when the transceiver of the client operates in sleep mode.

16. The method according to claim 1 wherein the base station continues to operate in communication mode with the client after each client time slot until a time calculated to take into account a worst case clock offset between the base station and the client.

17. The method according to claim 1 wherein the base station stops operating in communication mode with the client after the client has finished its communication with the base station during the client time slot.

18. The method according to claim 1, for enabling wireless communication between the base station and the client.

19. A TDMA communications system comprising:
a base station and a client each comprising a clock for synchronising TDMA communications therebetween,
the client comprising a transceiver configured to operate in a communication mode during one or more client time slots making up each frame of an allocated TDMA channel and to operate in a sleep mode at other times;
the base station comprising a transceiver configured to operate in a communication mode with said client during one or more base time slots making up each frame of said allocated TDMA channel, wherein a TDMA channel is defined by a sequence of frames, each frame comprising the one or more client time slots and the one or more respective base time slots, the one or more base time slot beginning in advance of and/or continuing after the one or more respective client time slot(s), such that when the transceiver begins operating in a communication mode said client is expected to be in a sleep mode or when the base station transceiver stops operating in a communication mode said client is expected to be in a sleep mode, wherein a determination that said client is expected to be in a sleep mode comprises taking into account an expected drift of the client clock and/or the base station clock.

20. A base station for a TDMA communications system comprising:
a base station clock for synchronising TDMA communication with a client; and
a transceiver configured to operate in a communication mode with said client during one or more base time slots making up a TDMA channel, the TDMA channel being defined by a sequence of frames, each frame comprising one or more client time slots and the one or more respective base time slots where the one or more base time slot is arranged to begin in advance of the one or more respective client time slot(s) making up said TDMA channel and/or to expire after the one or more respective client time slots, such that when the transceiver begins operating in a communication mode said client is expected to be in a sleep mode and/or when the base station transceiver stops operating in a communication mode said client is expected to be in a sleep mode, wherein a determination that said client is expected to be in a sleep mode comprises taking into account an expected drift of the client clock and/or the base station clock.

21. A client for a TDMA communications system comprising:
a client clock for synchronising TDMA communication with a base station; and
a transceiver configured to operate in a communication mode during one or more client time slots making up a TDMA channel and to operate in a sleep mode at other times;
wherein the TDMA channel is defined by a sequence of frames, each frame comprising the one or more client time slots and one or more a respective base time slots and the one or more client time slot(s) is arranged to begin after the one or more respective base time slot(s) making up said TDMA channel begins and/or to expire before the one or more respective base time slot(s) expires, such that when a transceiver of the base station begins operating in a communication mode said client is expected to be in a sleep mode and/or when the transceiver of the base station transceiver stops operating in a communication mode said client is expected to be in a sleep mode, wherein a determination that said client is expected to be in a sleep mode comprises taking into account an expected drift of the client clock and/or a base station clock.

* * * * *